No. 770,450. Patented September 20, 1904.

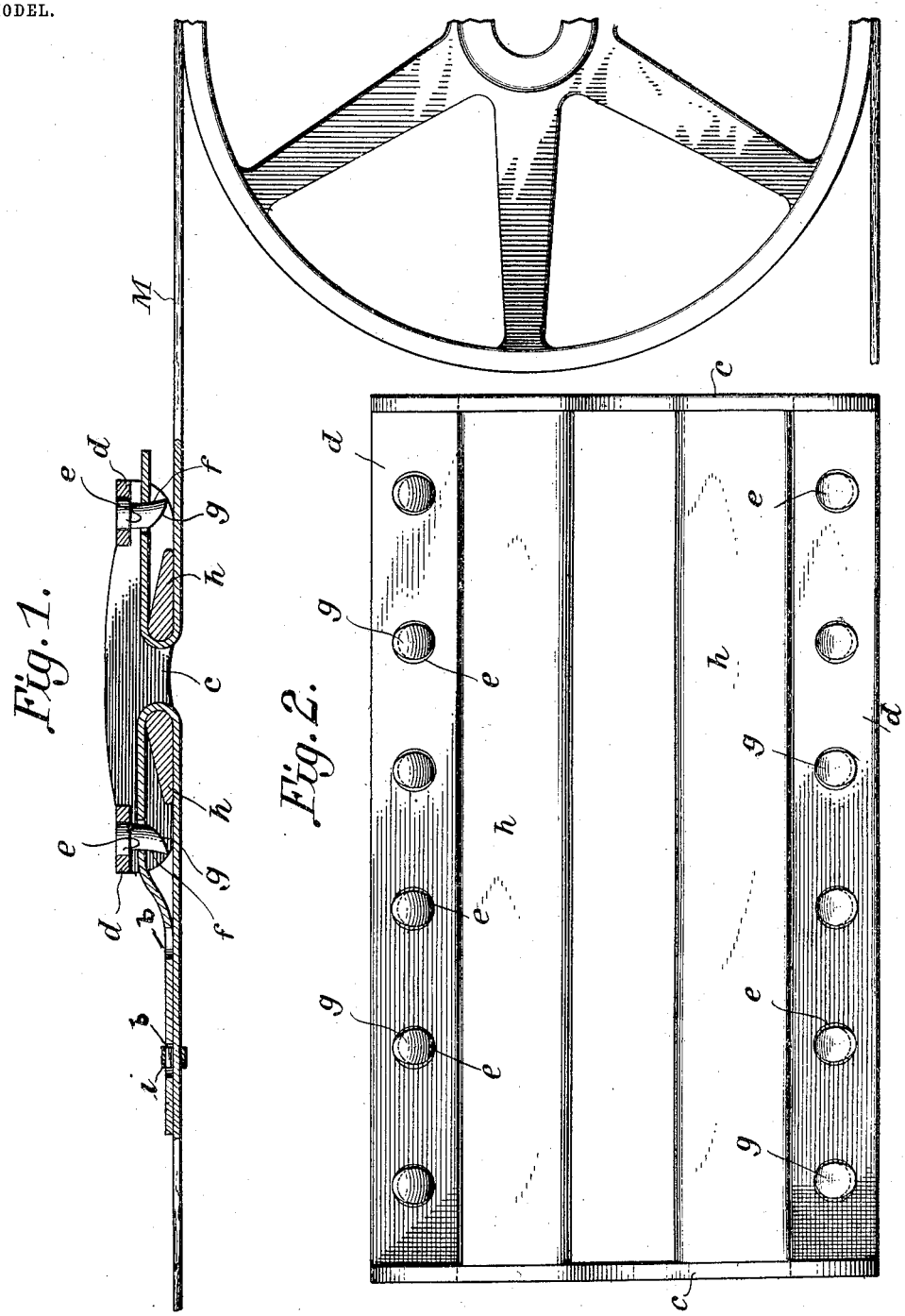

UNITED STATES PATENT OFFICE.

CLARENCE W. BRECKENRIDGE, OF FINDLAY, OHIO.

BELT-FASTENER.

SPECIFICATION forming part of Letters Patent No. 770,450, dated September 20, 1904.

Application filed December 14, 1903. Serial No. 185,117. (No model.)

*To all whom it may concern:*

Be it known that I, CLARENCE W. BRECKENRIDGE, a citizen of the United States of America, residing at Findlay, in the county of Hancock and State of Ohio, have invented certain new and useful Improvements in Belt-Fasteners, of which the following is a specification.

This invention relates to hose and beltings, and particularly to the subclass thereunder known as "belt-fasteners."

An object of the invention is to produce a belt-fastener whereby the belt may be adjusted or taken up longitudinally to compensate for the yielding or stretching of the belt or to compensate for the contraction of the belt, which results when it is not used.

Furthermore, an object of the invention is to provide novel means for adjusting the belt in the manner stated without cutting the end of the belt or impairing its strength and durability.

Furthermore, an object of the invention is to provide a fastener having pins for engaging the belt and in the provision of novel means for minimizing the strain on the pins.

Furthermore, an object of the invention is to provide novel means for permitting a ready adjustment of the belt over the surfaces of the pins as the belt is stretched.

Finally, an object of the invention is to produce a belt-fastener of the character noted which will possess advantages in points of utility and efficiency and proving at the same time comparatively inexpensive to manufacture.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in both views, and in which—

Figure 1 is a view in elevation of one end of the fastener, showing the belt applied thereto, a portion of the fastener being broken away to show one of the pins. Fig. 2 is a plan view of the fastener detached from the belt.

In the drawings, M indicates the belt, having holes $b$ to receive the pins or studs of the belt-fastener.

The belt-fastener comprises a frame having two end plates $c$ $c$, having connecting-bars $d$ at each end, and these connecting-bars $d$ have pins or studs $e$ projecting inwardly. The pins have concaved or inwardly-curved outer surfaces, as shown at $f$, and beveled ends, as shown at $g$. The bevel is for the purpose of permitting the belt M to slide thereover when being pulled, and the concaved or inwardly-bent outer surfaces $f$ are provided to prevent accidental displacement of the belt after it has been applied to the pins or studs.

Extending from the inner surfaces of the end plate $c$ and made integral therewith or attached thereto in any suitable manner are two plates or bars $h$, situated inside of the line of the pins in order that the ends of the belt may first be passed around the inner edges of the members $h$ and the two ends being drawn in opposite directions thereunder. The bars $h$ are tapered toward the pins in order to facilitate the removal of the belt. When the proper adjustment or tension of the belt is acquired, the belt is then passed over the pins $e$ and will be held thereon against displacement except through the manipulation of an operator. It is preferable that the ends of the pins extend outward beyond the under surface of the members $h$ as a precaution against the belt working out beyond the ends of the pins, since the said belt would be arrested by the members $h$, as is fully apparent.

It would be found in practice that when the belt is stretched there would be a considerable portion of the end overlapping the main portion of said belt, and in order to prevent flapping of the end a tie string or band $i$ is passed through the holes in the belt and under the main portion of said belt and secured in any suitable manner.

The fastener may be made of malleable or other iron, and the parts may be formed integral, or it may comprise a series of pieces joined together in any suitable manner.

The construction, operation, and advantages will, it is thought, be understood from the foregoing description, it being noted that various changes may be made in the proportions and details of construction for successfully carrying the invention into practice without departing from the scope.

Having fully described the invention, what I claim as new, and desire to secure by Letters Patent, is—

1. In a belt-fastener, a frame having bars, pins projecting from said bars and a central longitudinal section of each of said pins being concaved on its outer side, other bars connecting the sides of the frame, the second-named bars being set in from the ends of the frame beyond the first-named bars.

2. In a belt-fastener, a frame having bars, pins projecting from said bars, and a central longitudinal section of said pins being concaved on its outer side, other bars connecting the sides of the frame, the second-named bars being set in from the ends of the frame, the free ends of the pins projecting beyond the inner faces of the bars.

In testimony whereof I affix my signature, in the presence of two witnesses, this 9th day of December, 1903.

CLARENCE W. BRECKENRIDGE.

Witnesses:
LOUISE B. FLENNER,
T. GLEN CARPENTER.